United States Patent [19]

Iwaki et al.

[11] Patent Number: 4,590,415

[45] Date of Patent: May 20, 1986

[54] CONTROL APPARATUS FOR CHARGING GENERATOR

[75] Inventors: Yoshiyuki Iwaki; Tadashi Katashima, both of Hyogo, Japan

[73] Assignee: Mitsubishi Denki Kabushiki Kaisha, Tokyo, Japan

[21] Appl. No.: 621,651

[22] Filed: Jun. 18, 1984

[30] Foreign Application Priority Data

Jul. 15, 1983 [JP] Japan .................. 58-130010

[51] Int. Cl.⁴ .............................................. H02J 7/14
[52] U.S. Cl. ........................................ 320/64; 322/28; 322/33; 322/58
[58] Field of Search .............. 322/28, 73, 33, 58; 320/35, 36, 64, 68

[56] References Cited

U.S. PATENT DOCUMENTS

| | | | |
|---|---|---|---|
| 3,469,168 | 9/1969 | Harland, Jr. et al. | 320/64 |
| 3,643,153 | 2/1972 | Hanson et al. | 322/33 |
| 3,663,946 | 5/1972 | Iwaki | 322/73 X |
| 3,855,517 | 12/1974 | Allport | 322/28 X |
| 3,866,106 | 2/1975 | Taguchi et al. | 322/28 X |
| 4,023,089 | 5/1977 | Arakane | 322/99 X |
| 4,141,613 | 2/1979 | Mori et al. | 322/28 |

Primary Examiner—R. J. Hickey
Attorney, Agent, or Firm—Sughrue, Mion, Zinn, Macpeak & Seas

[57] ABSTRACT

A control apparatus for controlling the power supply to the field coil of a charging generator in which a smoothing capacitor of a low capacitance value is provided to prevent maloperation in the control circuit due to ripples in the output of the generator. A switching transistor controls the current flow through the field coil, while a control transistor controls the switching transistor and a zener diode is provided for energizing the control transistor. A first detection circuit is connected to the smoothing capacitor for detecting the rectified output of the generator and thereby producing a voltage at a first detection point. A second detection circuit produces a voltage at a second detection point which is higher than the first detection point voltage. An amplifying transistor having a base connected to the first detection point energizes the zener diode in accordance with the state of the output of either of the first and second detection circuits.

5 Claims, 5 Drawing Figures

CONTROL APPARATUS FOR CHARGING GENERATOR

BACKGROUND OF THE INVENTION

Referring to FIG. 1, a conventional control apparatus for a charging generator will be described. In FIG. 1, reference numeral 10 designates a generator, 1 a three-phase winding of a stator, 2 a field coil, 3 a rectifier, 31, 32 and 33 first, second, and third rectifier terminals, respectively, 4 a storage battery, 5 an indicator lamp, and 6 a key switch. Further, reference numeral 7 designates a control apparatus, 71 a switching element such as a switching transistor for turning on/off the field current in the field coil 2, 72 a transistor for controlling the switching transistor 71, 73 a zener diode used for detecting the output voltage of the generator 10, 74a and 75b, first and second resistors, respectively, constituting a first voltage dividing circuit, 74b and 75b third and fourth resistors, respectively, constituting a second voltage dividing circuit, and 76a and 76b diodes respectively connected in the first and second voltage dividing circuits and constituting an OR gate.

The operation of the apparatus of FIG. 1 will be described hereunder. Upon turning on the key switch 6, a current flows from the storage battery 4 to the switching transistor 71 through the key switch 6, the indicator lamp 5, and the field coil 2 so that the indicator lamp 5 is lit and the field coil 2 is excited. Then, the engine is started and the generator 10 is driven to generate electric power. A voltage appears at each of the first and second output terminals 31 and 32 so that a charging current flows from the first output terminal 31 into the storage battery 4 to both start the charging of the battery and turn off the indicator lamp 5. The indicator lamp 5 is turned off because the same voltages are produced at the output terminals 31 and 32, and therefore the potentials at the two terminals of the indicator lamp 5 are equal to each other.

When the rate of rotation of the generator is further increased and the division voltage at a first detection point a rises above a predetermined value, the zener diode 73 is energized, the control transistor 72 is made conductive, and the switching transistor 71 is turned off. Accordingly, the current in the field coil decreases to lower the voltage generated by the generator 10. Then, the switching transistor 71 is turned on again to increase the output voltage of the generator. In this manner, the output voltage of the generator 10 is held at a predetermined value.

The division voltage at a second detection point b (a second set value) is set to a higher value than the division voltage at the first detection point a (a first set value). Thus, if disconnection occurs in the first detection circuit for some reason such as a connector coming loose, the control operation of the apparatus is performed using the second set value, thereby preventing overcharging of the storage battery 4.

In the AC generator of this type, ripples are included in the rectified current; the larger the output current, the higher the ripples become. Further, there is a disadvantage that the zener diode 73 may be energized in spite of an insufficient value of the output voltage of the generator 10 because the zener diode 73 is energized by the peak value of the output of the generator while the storage battery 4 is charged with the mean value of the output of the generator 10.

SUMMARY OF THE INVENTION

An object of the present invention is to eliminate the disadvantages in the prior art as described above.

Another object of the present invention is to provide a control apparatus for a charging generator in which a smoothing capacitor provided to eliminate influence of ripples in the generator output has a small capacitance value.

A further object of the present invention is to provide a control apparatus for a charging generator in which the influence of ripples in the output of the generator is eliminated by a smoothing capacitor without increasing the number of control elements.

In order to attain the above objects, according to the present invention, a control apparatus for a charging generator comprises a storage battery to be charged by a rectified output of an AC generator having a field coil, a switching apparatus for on/off controlling the field coil, a control transistor for controlling the switching transistor, a zener diode for energizing the control transistor, a first detection circuit connected to a smoothing capacitor for detecting the rectified output and producing a voltage at a first detection point, a second detection circuit for producing a voltage at a second detection point which is higher than the first detection point voltage, an amplifying transistor with its base connected to the first detection point, and a diode with its anode connected to the second detection point, whereby the zener diode is energized by the output of the first detection circuit or the second detection circuit.

Other objects and advantages of the present invention will be apparent from the following description taken in connection with the accompanying drawings.

DESCRIPTION OF THE PREFERRED EMBODIMENTS

Figure 1:
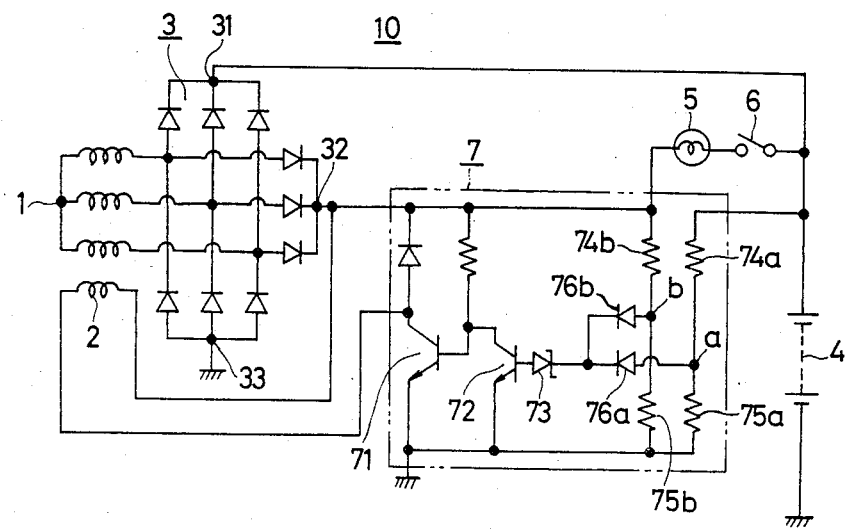
FIG. 1 is a circuit diagram of a conventional apparatus as described above.
Figure 2:
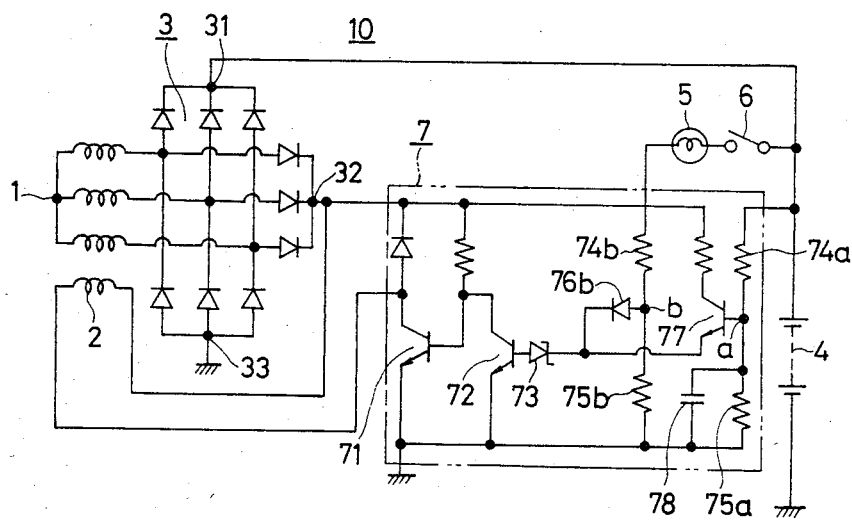
FIG. 2 is a circuit diagram of a first embodiment of a control apparatus for a charging generator of the present invention.

In FIG. 2, reference numerals commonly used in FIG. 1 designate the same or equivalent parts. In FIG. 2, reference numeral 77 designates a transistor provided in place of the diode 76a of FIG. 1. The base of the transistor 77 is connected to a first detection point a between the voltage dividing resistors 74a and 75a. The collector and emitter of the transistor 77 are connected to the second rectifier output terminal 32 through a resistor and to the cathode of the zener diode 73, respectively. Reference numeral 78 designated a smoothing capacitor connected in parallel with the voltage dividing resistor 75a.

In the circuit of FIG. 2, if the current amplification factor of the transistor 77 is properly selected, the resistance values of the detection resistors 74a and 75a can be increased to increase the smoothing effect of the capacitor 78 without changing the circuit of the control transistor 72. The embodiment of FIG. 2 has an advantage that, since the diode 76a is replaced by the transistor 77, the resistance values of the detection resistors 74a and 75a constituting the first voltage dividing circuit can be made large to increase the smoothing effect of the capacitor 78 without increasing the number of active elements in the circuit.

Figure 3:
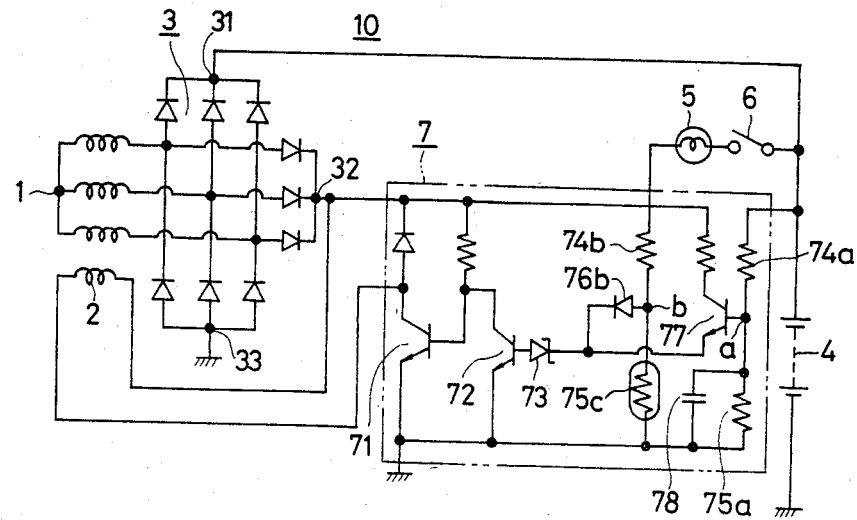
FIG. 3 is a circuit diagram showing a second embodiment of the present invention.

FIG. 3 is a circuit diagram showing a second embodiment of a control apparatus of the present invention, which also acts to protect the generator 19 from overheating. This embodiment differs from the FIG. 2 embodiment in that the resistor 75b of the second voltage dividing circuit is replaced by a positive characteristic thermistor 75c having a positive temperature coefficient.

If the resistance value and the temperature characteristic of the positive characteristic thermistor 75c are properly chosen, when the temperature exceeds a preset value, the potential at the second detection point b exceeds the potential at the first detection point a so that the generator 10 is controlled with a low voltage, thereby lowering the output of the generator and reducing the amount of heat generated therein. Thus, this apparatus has the advantage that the generator 10 is prevented from being burnt out, even in the case where the ambient temperature of the generator rises abnormally because of trouble such as a lack of coolant for the engine of the vehicle. In this embodiment, a new effect of protection against overheating is added to the effect of the conventional circuit of FIG. 1 in which the second detection circuit (74b and 75b) is only a redundant protection circuit which is not use in normal operations. The second detection circuit (74b and 75b) is a protection circuit for the first detection circuit (74a and 75a) and has a set voltage which is higher than that of the latter circuit so that generally it is not necessary to provide a smoothing capacitor or the like in the second voltage dividing circuit.

Figure 5:
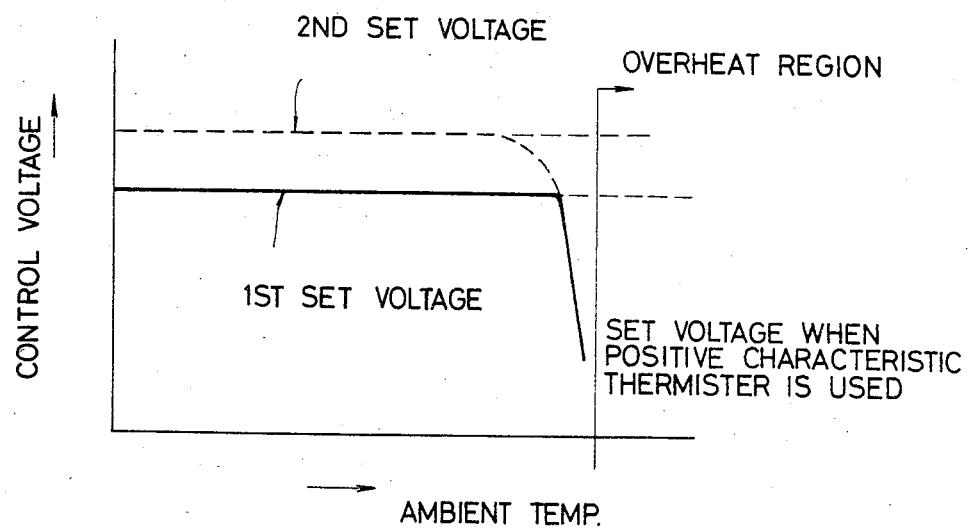
FIG. 5 is a diagram showing a voltage control characteristic produced with the present invention.

FIG. 5 is a diagram of the control voltage characteristic illustrating the way in which overheating protection is provided by the embodiment of FIG. 3.

It thus may be associated that, according to the embodiment of FIG. 3, an effect of overheating protection is provided in addition to the effect that the resistance values of the detection resistors 74a and 75a can be made large to thereby improve the smoothing effect of the capacitor 78.

Figure 4:
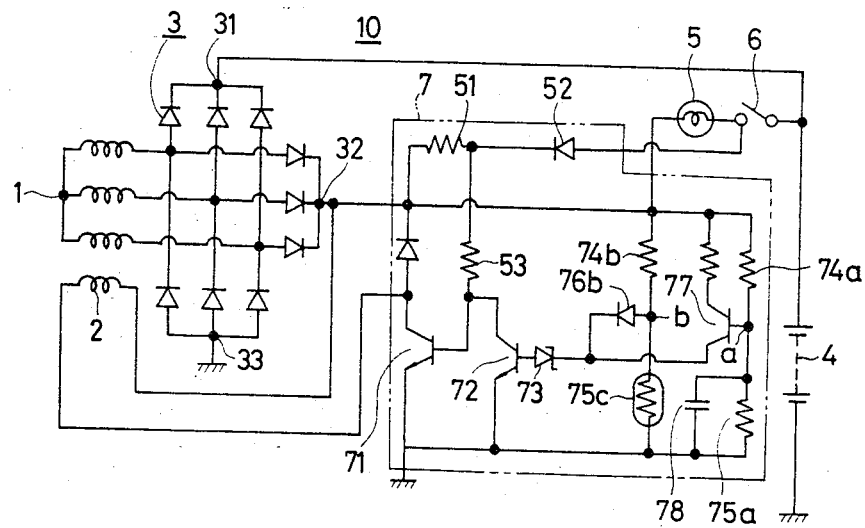
FIG. 4 is a circuit diagram showing a third embodiment of the present invention.

FIG. 4 is a circuit diagram showing a third embodiment of the present invention. The control apparatus for a charging generator of this embodiment is arranged such that the voltage at the detection point a is detected using the output of the second rectifier output terminal 32. The detection resistors operate as an overheating protection circuit. In FIG. 4, reference numeral 51 designates an initial exciting resistor, 52 a diode for blocking reverse current flow from the second rectifier output terminal 32 to the storage battery 4, and 53 a bias resistor for the transistor 71. When the key switch 6 is closed in the stopped state of the engine, exciting currents flow into the field coil 2 through parallel circuits, one being the circuit from the storage battery 4 to the field coil 2 through the key switch 6 and the indicator lamp 5, and the other being the circuit from the storage battery 4 to the field coil 2 through the key switch 6, the diode 52, and the resistor 51. These currents vanish when the engine drives the generator to initiate power generation. The bias current for the transistor 71 flows from the storage battery 4 to the resistor 53 during stoppage of the engine, and flows form the second rectifier output terminal 32 of the generator to the resistor 53 through the resistor 51 during the driving period of the generator.

We claim:

1. A control apparatus for an AC charging generator having a field coil, comprising:
   a storage battery coupled to be charged by a rectified output of said AC generator;
   a switching transistor for on/off controlling a current flow through said field coil;
   a control transistor for controlling said switching transistor;
   a zener diode for energizing said control transistor having an anode connected to a base of said control transistor;
   a smoothing capacitor;
   a first detection circuit comprising a first voltage dividing resistance connected to said smoothing capacitor for detecting said rectified output and producing a substantially ripple free voltage at a first detection point;
   a second detection circuit for producing a voltage at a second detection point which is higher than said first detection point voltage;
   an amplifying transistor having a base connected to said first detection point and being selectively energized by the voltage level at said first detection point to energize said zener diode when the generator output reaches a selected level; and
   a diode having an anode connected to said second detection point and a cathode connected to a cathode of said zener diode, said zener diode being coupled to be energized by either the output of said amplifying transistor or by an output of said second detection circuit,
   said amplifying transistor having a current amplification factor selected in dependence upon the values of said first voltage dividing resistance so that a smoothing capacitor with a small capacitance value and the first voltage dividing resistance with a large resistance value can be used to produce a substantially ripple free voltage at said first detection point while having a sufficient current to energize said zener diode when the generator output reaches said selected level.

2. A control apparatus for an AC charging generator having a field coil, comprising:
   a storage battery coupled to be charged by a rectified output of said AC generator;
   a switching transistor for on/off controlling a current flow through said field coil;
   a control transistor for controlling said switching transistor;
   a zener diode for energizing said control transistor having an anode connected to a base of said control transistor;
   a smoothing capacitor;
   a first detection circuit comprising a first voltage dividing resistance connected to said smoothing capacitor for detecting said rectified output and producing a substantially ripple free voltage at a first detection point;
   a second detection circuit for producing a voltage at a second detection point which is higher than said first detection point voltage, said second detection circuit comprising voltage dividing resistors including a thermistor;

an amplifying transistor having a base connected to said first detection point and being selectively energized by the voltage level at said first detection point to energize said zener diode when the generator output reaches a selected level; and a diode having an anode connected to said second detection point and a cathode connected to a cathode of said zener diode, said zener diode being coupled to be energized by either the output of said amplifying transistor or by an output of said second detection circuit, said amplifying transistor having a current amplification factor selected in dependence upon the values of said first voltage dividing resistance so that a smoothing capacitor with a small capacitance value and the first voltage dividing resistance with a large resistance value can be used to produce a substantially ripple free voltage at said first detection point while having a sufficient current to energize said zener diode when the generator output reaches said selected level.

3. A control apparatus for an AC charging generator having a field coil, comprising:

a storage battery coupled to be charged by a first rectified output of said AC generator;

a switching transistor for on/off controlling a current flow through said field coil;

a control transistor for controlling said switching transistor;

a zener diode having an anode connected to a base of said control transistor;

a first detection circuit comprising a first voltage dividing resistor connected between said first rectified output and a ground terminal for producing a substantially ripple free voltage at a first detection point at an intermediate point of said first voltage dividing resistor;

a smoothing capacitor connected in parallel with said first voltage dividing resistor;

a second detection circuit comprising a second voltage dividing resistor connected between a second rectified output of said generator and said ground terminal for producing a voltage at a second detection point at an intermediate point of said second voltage dividing resistor established such that said second detection point voltage is higher than said first detection point voltage;

an amplifying transistor having a base connected to said first detection point, said amplifying transistor being made conductive to energize said zener diode when said first detection point voltage exceeds a predetermined value proportional to a predetermined generator output;

a diode having an anode connected to said second detection point and cathode connected to a cathode of said zener diode; and a series connection of a key switch and a charge indicator lamp connected between said first and second rectified outputs, said zener diode being coupled to be energized by either the output of said amplifying transistor or by an output of said second detection circuit, said amplifying transistor having a current amplification factor selected in dependence upon the values of said first voltage dividing resistance so that a smoothing capacitor with a small capacitance value and the first voltage dividing resistance with a large resistance value can be used to produce a substantially ripple free voltage at said first detection point while having a sufficient current to energize said zener diode when the generator output reaches said selected level.

4. The control apparatus for a charging generator according to claim 3 wherein said second detection circuit comprises voltage dividing resistors, one of which is a thermistor.

5. A control apparatus for an AC charging generator having a field coil, comprising:

a storage battery coupled to be charged by a first rectified output of said AC generator;

a switching transistor for on/off controlling a current flow through said field coil;

a control transistor for controlling said switching transistor;

a zener diode having an anode connected to a base of said control transistor;

a first detection circuit comprising a first voltage dividing resistor connected between a second rectified output terminal of said generator and a ground terminal for producing a substantially ripple free voltage at a first detection point at an intermediate point of said first voltage dividing resistor;

a smoothing capacitor connected in parallel with said first voltage dividing resistor;

a second detection circuit comprising a second voltage dividing resistor connected between said second rectified output and said ground terminal for producing a voltage at a second detection point at an intermediate point of said second voltage dividing resistor, said second detection point voltage being higher than said first detection point voltage;

an amplifying transistor having a base connected to said first detection point, said amplifying transistor being made conductive to energize said zener diode when said first detection point voltage exceeds a predetermined value proportional to a predetermined generator output;

a diode having an anode connected to said second detection point and cathode connected to a cathode of said zener diode;

a key switch having a first terminal connected to said first rectified output;

a charge indicator lamp connected between a second terminal of said key switch and said second rectifier-output terminal; and a series connection of an initial excitation resistor and a reverse current blocking diode connected in parallel with said charge indicator lamp, said zener diode being coupled to be energized by either the output of said amplifying transistor or by an output of said second detection circuit, said amplifying transistor having a current amplification factor selected in dependence upon the values of said first voltage dividing resistance so that a smoothing capacitor with a small capacitance value and the first voltage dividing resistance with a large resistance value can be used to produce a substantially ripple free voltage at said first detection point while having a sufficient current to energize said zener diode when the generator output reaches said selected level.

* * * * *